UNITED STATES PATENT OFFICE.

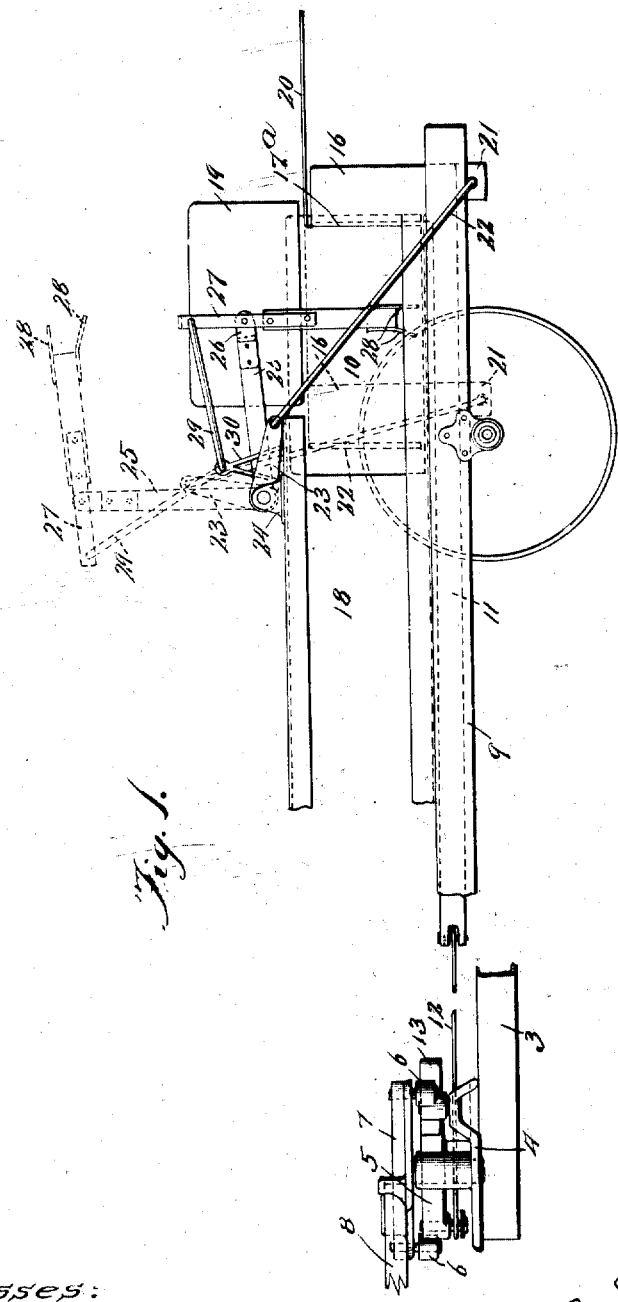

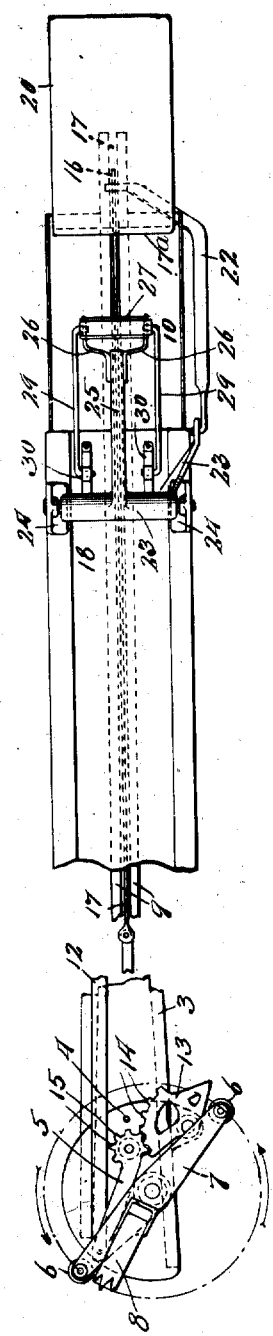

JOSEPH DAIN AND HERBERT B. SPERRY, OF OTTUMWA, IOWA, ASSIGNORS TO DAIN MANUFACTURING COMPANY OF IOWA, OF OTTUMWA, IOWA, A CORPORATION OF IOWA.

HAY-PRESS.

1,244,035.  Specification of Letters Patent.  Patented Oct. 23, 1917.

Application filed July 1, 1910. Serial No. 569,924.

*To all whom it may concern:*

Be it known that we, JOSEPH DAIN and HERBERT B. SPERRY, citizens of the United States, residing at Ottumwa, in the county of Wapello and State of Iowa, have invented certain new and useful Improvements in Hay-Presses, of which the following is a specification, reference being had to the accompanying drawings.

Our invention relates to hay presses; more particularly a horse press of the pull power type shown in Patent #807911 issued December 19, 1905 to Joseph Dain and has for its object to provide certain improvements therein; such improvements having to do more particularly with inserting the hay from the hopper into the compression chamber. To this end our invention consists in providing improved means for pushing the hay from the hopper into the compression chamber in advance of the reciprocating plunger, thereby lessening the manual work of operating the press. By saving for the man feeding the press the time and labor of preparing the charges of hay and inserting them into the press, his attention and effort can be concentrated in preparing larger charges of hay in position for our improved device to carry into the press, thereby increasing to quite an extent the capacity of the machine or the day's output of bales. For this reason it is not only a labor saving device but also one which increases the revenue earning power of the press.

A further feature of the invention consists in so mounting the hay inserting means that it will enter the compression chamber practically perpendicularly to the path of the plunger face, inserting the hay in the best possible manner for the making of neat, smooth bales; and in operating the hay inserting means in a manner so that it will swing clear of the hopper and not interfere with the placing of the next succeeding charge in proper position for insertion.

The simplicity and positive manner of operation is a further advantage of our construction.

We accomplish the objects of our invention as illustrated in the drawings and as hereinafter described. What we regard as new is set forth in the claims.

In the drawings

Figure (1) is a partial side elevation of a pull power press embodying our invention, with the near side of the compression chamber casing omitted, and Fig. (2) is a plan view of parts shown in Fig. (1) with the hopper removed, showing in dotted lines a changed-phase position of the plunger and the feeder. (3) indicates the frame of the power portion on which is mounted the main frame (4) which supports a swinging link (5) operated by rollers (6—6) carried by a rotating cross-head (7) to which is attached a lever (8) to which the draft animals are hitched.

9—9 as shown in Fig. 2 indicate channel irons suitably secured below the bottom of the bale-case 18 to form a cavity through which the plunger-bar 11 reciprocates. The plunger-bar 11 is actuated by a pull rod 12 connected to the outer or free end of the swinging link 5.

13 indicates a supplementary swinging link mounted on the frame 4, the object of which is to positively insure the return of the plunger-bar 11 to its normal or rearmost position after it has been drawn forward by the link 5. This is accomplished through the medium of gear teeth 14 which mesh with gear teeth 15 formed on the hub of the swinging link 5. In operation, after one of the rollers 6—6 passes off of the link 5, the other roller engages a plain face of the supplementary swinging link 13 and swings it around pivotally. The teeth 14 mesh with the teeth 15 causing the link 5 to swing back in normal position to be again engaged by one of the rollers 6—6, thus the plunger-bar 11 being reciprocated back and forth through the cavity between channel irons 9—9.

16 indicates a plunger upright connected to plunger-bar 11 and operating through an opening 17 between the channel irons 9—9. To the plunger upright 16 is fastened a face plate 17ª which is of practically the same dimensions as the space within the compression chamber 10. When the plunger-bar 11 is moved forward, the hay within the compression chamber 10 is carried ahead by the plunger 17ª into the bale-case 18.

19 indicates a hopper of suitable form into which the product being baled is pitched. At the time the hay is placed in the hopper 19, the hay inserting mechanism is in the position indicated in dotted lines and the aperture from the hopper into the compression chamber is closed by a shield 20 attached to the plunger upright 16 and connected to the face of the plunger 17ª.

22 indicates a link which can be attached to any moving part of the press. In the construction shown, it is preferably attached to an extension of the plunger upright as indicated at 21. At its upper end the link 22 is attached to a rocking arm 23 mounted upon suitable brackets 24—24 as best shown in Fig. 2. The rocking arm 23 has an extended portion 25 to which are attached hinged brackets 26—26 upon which is pivotally mounted a feeder arm 27, the lower portion of which is provided with hay engaging means 28—28, as best shown in Fig. 1.

29—29 indicate paralleling links pivotally attached at their forward ends to a bracket 30 supported by the bale-case 18. The rear ends of the paralleling links 29—29 are pivotally attached to the feeder arm 27 and guide the feeder arm and hay engaging means 28—28 through the aperture and into and out of the compression chamber 10 when the rocking arm 23 is actuated by the reciprocating movement of the plunger-bar 11 through the medium of the connecting link 22. The pivotal point of the paralleling arms 29—29 in the bracket 30 is so related to the pivotal point of the rocking arm 23, and extension 25 in the brackets 24, that the hay engaging means 28—28 travel approximately in a perpendicular line. When the feeder arm 27 has been moved to a point where the hay engaging means 28—28 are above the aperture or approximately in line with the upper portion of the hopper 19—19, then the lower portion of the arm 27 or that part to which the hay engaging means 28—28 are attached, swings more rapidly than the upper portion or where the paralleling arms 29—29 attach, which movement tends to carry the feeder arm and hay engaging means rapidly out of the way of the next succeeding charge of hay to be pitched into the hopper. The operation is as follows: When draft is applied to the lever 8, one of the rollers 6—6 engages the link 5 and draws the pull bar 12 and plunger-bar 11 forward, carrying the hay in front of the plunger 17ª from the compression chamber 10 into the bale-case 18. Simultaneous with the forward movement of the plunger 17ª, the link 22 rocks the arm 23 upward, moving the extension 25 also upward and carrying with it the feeder arm 27. At the extreme forward movement of the plunger 17ª, the parts assume the position shown in dotted lines, at which time the aperture into the compression chamber 10 is closed and the hay is pitched into the hopper 19. After the roller 6—6 passes off of the swinging link 5, the other roller 6—6 engages the supplementary swinging link 13, actuating it in such a manner as to reverse the movement of the swinging link 5, which forces the pull bar 12, and plunger-bar 11, and the plunger 17ª backward. Simultaneously with this movement, the feed aperture is opened and the link 22 draws the rocking arm 23 downward; the extension arm 25 carrying the feeder arm 27 with it, the same being guided properly through the feed aperture by the paralleling arms 29—29.

We thus provide a very simple and efficient construction for automatically inserting the hay from the hopper into the compression chamber and carrying it into bale-case 18 in such form as to be made into compact bales.

By our new and improved form and arrangement of parts, we have provided a machine which can be backed up to one side of a stack at about its middle point into close proximity with the stack so that one man can feed the hay into the compression-chamber without the necessity for the hay being handled a plurality of times. This result is attained by reason of the arrangement of feeder mechanism so as to be reciprocated into and out of the feed opening from that edge of the feed opening located away from the stack, together with the arrangement by which the compression stroke of the plunger and the delivery of the completed bale are both in the direction away from the stack.

That which we claim as our invention and desire to secure by Letters Patent is,

1. In a hay-press, the combination of a bale-case having a feeding opening, a plunger, means for actuating said plunger, a swinging arm pivotally mounted on the bale-case adjacent to the feeding opening, a feeder-head pivotally mounted intermediately on said arm and adapted to operate through said opening to feed the hay into the baling chamber, a bracket located between the axis of said arm and said feeding opening, a link pivotally connected to said bracket at a point a short distance above the pivotal axis of said arm on said bale-case and pivotally connected with the upper end portion of the feeder-head, and means positively actuated by the movement of the plunger for operating said swinging arm to move the feeder-head into and out of the feeding opening as the plunger reciprocates.

2. In a hay-press, the combination of a bale-case having a feeding opening, a plunger, means for actuating said plunger, a swinging arm pivotally mounted on the bale-case adjacent to the feeding opening, a feeder-head pivotally mounted intermediately on said arm and adapted to operate through said opening to feed the hay into the baling chamber, a bracket located between the axis of said arm and said feeding opening, a link pivotally connected to said bracket at a point a short distance above the pivotal axis of said arm on said bale-case and pivotally connected with the upper end portion of the feeder-head, and means adapted upon the movement of the plunger toward the plunger-actuating means to cause said arm to swing about its axis for carrying said feeder-head upward out of said feeding opening.

3. In a hay-press, the combination of a bale-case having a feeding opening, a plunger, means for actuating said plunger, a swinging arm pivotally mounted on the bale-case adjacent to the feeding opening, a feeder-head pivotally mounted intermediately on said arm and adapted to operate through said opening to feed the hay into the baling chamber, a link pivotally connected with the bale-case between the axis of said arm and the feeding opening and pivotally connected with the upper end portion of the feeder-head, a second arm adapted to swing with said first-named arm, and a second link pivotally connected with said second arm and with the plunger forward of the axis of said two arms.

4. A hay press, comprising a bale-case having a compression chamber and a feeding opening thereinto adjacent to one end of the bale-case, a plunger operating in said bale-case and movable away from said end of the bale-case on its compression stroke, pull-power mechanism at the opposite end of the bale-case for operating said plunger, means at the lower side of the bale-case for operatively connecting the power mechanism with the plunger, a feeder mounted on the bale-case between said feeding opening and the power end of the press and movable into the feeding opening, whereby the feeding end of the press may be backed up close to the stack with the feeding opening in close proximity thereto, the bale will be delivered away from the stack, and access from the stack to the feeding opening will be unobstructed by the feeder, and means operatively connecting the feeder with the plunger-operating mechanism.

JOSEPH DAIN.
HERBERT B. SPERRY.

Witnesses:
JOSEPH H. BROWNING,
W. G. DUFFIELD.